United States Patent
Fekrmandi et al.

(10) Patent No.: US 11,781,698 B2
(45) Date of Patent: Oct. 10, 2023

(54) MODULAR ROBOTIC CRAWLER WITH HYBRID LOCOMOTION FOR INSPECTION OF SMALL DIAMETER PIPE

(71) Applicant: South Dakota Board of Regents, Pierre, SD (US)

(72) Inventors: Hadi Fekrmandi, Rapid City, SD (US); Phillip Hillard, Rapid City, SD (US); Skye Rutan-Bedard, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 363 days.

(21) Appl. No.: 16/953,237

(22) Filed: Nov. 19, 2020

(65) Prior Publication Data
US 2021/0148503 A1 May 20, 2021

Related U.S. Application Data

(60) Provisional application No. 62/937,649, filed on Nov. 19, 2019.

(51) Int. Cl.
*F16L 55/34* (2006.01)
*B62D 57/032* (2006.01)
*F16L 101/30* (2006.01)

(52) U.S. Cl.
CPC .......... *F16L 55/34* (2013.01); *B62D 57/032* (2013.01); *F16L 2101/30* (2013.01)

(58) Field of Classification Search
CPC . F16L 55/34; F16L 55/26; F16L 55/32; F16L 2101/30; B62D 57/032
See application file for complete search history.

(56) References Cited

U.S. PATENT DOCUMENTS

| | | | |
|---|---|---|---|
| 3,942,560 A | * | 3/1976 | Deaver ............... F16L 55/1283 137/802 |
| 4,148,307 A | | 4/1979 | Utsugi |
| 4,735,501 A | | 4/1988 | Ginsburgh et al. |

(Continued)

FOREIGN PATENT DOCUMENTS

GB 1534441 A 12/1978

OTHER PUBLICATIONS

A. Zagler and F. Pfeiffer, Moritz a pipe crawler for tube junctions, in Proc. of the 2003 IEEE International Conference on Robotics & Automation (ICRA '03), pp. 2954-2959, 2003.

(Continued)

*Primary Examiner* — Kevin Hurley
*Assistant Examiner* — Michael R Stabley
(74) *Attorney, Agent, or Firm* — Goodhue, Coleman & Owens, P.C.

(57) ABSTRACT

A modular pipe-crawling robot for in-pipe maintenance operations in aspects of the present disclosure may have one or more of the following features: (a) at least two locomotion modules, (b) each module has feet which can extend outward to grip a wall of a pipe while simultaneously reducing its length or disengaging its feet from the inner wall while increasing its length, (c) a gear mechanism built into mechanical linkage, wherein each module's feet are held perpendicular with respect to the inner wall of the pipe, and (d) a joint coupling the at least two modules.

19 Claims, 10 Drawing Sheets

(56) References Cited

U.S. PATENT DOCUMENTS

| | | | |
|---|---|---|---|
| 4,852,391 A * | 8/1989 | Ruch | F16L 55/1283 73/40.5 R |
| 4,919,223 A * | 4/1990 | Egger | G01M 3/005 180/8.1 |
| 5,309,844 A * | 5/1994 | Zollinger | F16L 55/30 104/138.2 |
| 5,375,530 A * | 12/1994 | Zollinger | F16L 55/26 104/138.1 |
| 5,595,565 A | 1/1997 | Treat et al. | |
| 5,604,531 A | 2/1997 | Iddan et al. | |
| 6,071,234 A | 6/2000 | Takada | |
| 6,339,993 B1 * | 1/2002 | Comello | F16L 55/28 73/866.5 |
| 6,427,602 B1 * | 8/2002 | Hovis | F16L 55/34 104/138.1 |
| 6,450,104 B1 * | 9/2002 | Grant | B08B 9/049 104/138.1 |
| 6,870,343 B2 * | 3/2005 | Borenstein | B08B 9/045 318/567 |
| 6,917,176 B2 | 7/2005 | Schempf et al. | |
| 7,597,048 B2 * | 10/2009 | Nicholson | F16L 55/34 104/138.2 |
| 7,617,558 B2 * | 11/2009 | Boe | B08B 9/051 15/104.061 |
| 7,954,575 B1 * | 6/2011 | Bloxsom | H02G 1/088 180/9.1 |
| 8,402,911 B1 * | 3/2013 | Weisenberg | B05B 3/14 427/236 |
| 9,353,902 B2 * | 5/2016 | Early | F16L 55/265 |
| 9,657,884 B1 * | 5/2017 | Carte | F16L 55/44 |
| 9,927,060 B2 * | 3/2018 | Moses | F16L 55/34 |
| 10,343,197 B2 * | 7/2019 | Schaller | B08B 9/051 |
| 2006/0064829 A1 * | 3/2006 | Houldey | F16L 55/28 15/104.061 |

OTHER PUBLICATIONS

Ab Rashid, M. Z., Yakub, M. F. M., bin Shaikh Salim, S. A. Z., Mamat, N., Putra, S. M. S. M., and Roslan, S. A., 2020. "Modeling of the in-pipe inspection robot: A comprehensive review". Ocean Engineering, 203, p. 107206.

Abrahao, Anthony, Hadi Fekrmandi, Erim Gokce, Ryan Sheffield, and Dwayne McDaniel. Development of Inspection tools for the ay-102 double-shell tank at the hanford doe site-16383. Applied Research Center, Florida International University. WM2016 Conference, Mar. 6-10, 2016, Phoenix, AZ. pp 1-13.

Akina Kuwada, Kodai Tsujino, Koichi Suzumori and Takefumi Kanda, Intelligent actuators realizing snake-like small robot for pipe inspection, MHS 2006 Micro-Nano COE, MP1-2-1, 2 pages (abstract), 2006.

Allen, J., Rutan-Bedard, S., and Fekrmandi, H., 2020. "Robotic inspection crawler for small diameter complex piping". In USCToMM Symposium on Mechanical Systems and Robotics, Springer, pp. 298-309.

Andrews, David. "Submarine Design." Encyclopedia of Maritime and Offshore Engineering (2017): Abstract, 2 pages.

Atushi Kakogawa, Shugen Ma, Mobility of an In-pipe Robot with Screw Drive Mechanism inside Curved Pipes, IEEE Int. Conference of Robotics and Bimimetics, 2 pages (Abstract), 2010.

Baghalian, A., et al., Non-contact quantification of longitudinal and circumferential defects in pipes using the surface response to excitation (sure) method. J. Prognostics Health Manage, 2017. 8: pp. 1-8.

Bogue, Robert. "Bioinspired designs impart robots with unique capabilities." Industrial Robot: the international journal of robotics research and application (2019), 1 page (Abstract).

Chablat, Damien, Swaminath Venkateswaran, and Frédéric Boyer. "Dynamic model of a bio-inspired robot for piping inspection." In ROMANSY 22—Robot Design, Dynamics and Control, pp. 42-51. Springer, Cham, 2019. 11 pages.

Chen, Jingdao, and Yong K. Cho. "Detection of Damaged Infrastructure on Disaster Sites using Mobile Robots." In 2019 16th International Conference on Ubiquitous Robots (UR), pp. 648-653. IEEE, 2019. 6 pages.

Ciszewski, M., Giergiel, M., Buratowski, T., and Małka, P., 2020. "Robotic inspection of pipelines". In Modeling and Control of a Tracked Mobile Robot for Pipeline Inspection. Springer, pp. 5-21.

Derammelaere, S., Debruyne, C., De Belie, F., Stockman, K., and Vandevelde, L., 2014. "Load angle estimation for two-phase hybrid stepping motors". IET Electric power applications, 8(7), pp. 257-266.

Derammelaere, Stijn, Bram Vervisch, Jasper De Viaene, and Kurt Stockman. "Sensorless load angle control for two-phase hybrid stepper motors." Mechatronics 43 (2017): pp. 6-17.

Derammelaere, Stijn, Florian Verbelen, and Kurt Stockman. "Open loop control of a stepping motor with step loss detection and stall detection using back-EMF based load angle estimation." In 2014 IEEE/ASME International Conference on Advanced Intelligent Mechatronics, pp. 788-793. IEEE, 2014. 6 pages.

Dibono, Michael, Anthony Abrahao, Dwayne McDaniel, and Yew Teck Tan. "Development and testing of robotic inspection tools for the hanford high-level waste double shell tanks." In WM Symposia. 2017. 4 pages.

Edwin Dertien, Stefano Stramigioli, Kees Pulles, Development of an inspection robot for small diameter gas distribution mains, IEEE International Conference on Robotics and Automation, pp. 5044-5049, 2011.

Fekrmandi, H., and Y. S. Gwon. "Reliability of surface response to excitation method for data-driven prognostics using Gaussian process regression." In Health Monitoring of Structural and Biological Systems XII, vol. 10600, p. 106002R. International Society for Optics and Photonics, 2018, 9 pages.

Fekrmandi, H., et al., A novel approach for classification of loads on plate structures using artificial neural networks. Measurement, 2016. 82: p. 37-45.

Fekrmandi, H., et al., Inspection of the integrity of a multi-bolt robotic arm using a scanning laser vibrometer and implementing the surface response to excitation method (SuRE). International Journal of Prognostics and Health Management, 2014. 5(1): pp. 1-10.

Fekrmandi, H., et al., Investigation of the computational efficiency and validity of the surface response to excitation method. Measurement, 2015. 62: pp. 33-40.

Fekrmandi, H., R. Sheffield, and D. McDaniel. "Validation of the miniature inspection tool for the ay-102 double-shell tank at the hanford doe site." In 29'st Florida Conference on Recent Advances in Robotics. Proceedings. FCRAR2016. 2016. pp. 1-13.

Fekrmandi, Hadi, and Phillip Hillard. "A pipe-crawling robot using bio-inspired peristaltic locomotion and modular actuated nondestructive evaluation mechanism." In Bioinspiration, Biomimetics, and Bioreplication IX, vol. 10965, pp. 1096508-1 through 1096508-8. International Society for Optics and Photonics, 2019. 8 pages.

Fekrmandi, Hadi, John Hillard, and William Staib. "Design of a bio-inspired crawler for autonomous pipe inspection and repair using high pressure cold spray." In 31'st Florida Conference on Recent Advances in Robotics. Proceedings. FCRAR2018, vol. 31, pp. 97-102. 2018. 6 pages.

H. Streich and O. Adria, Software approach for the autonomous inspection robot MAKRO, In Robotcs and Automation, 2004. Proceedings, ICRA '04 IEEE International Conference, 2004 (2 pages, Abstract).

Hirose, S., 2013. "Development of robotic systems for the decommissioning operation of fukushima-daiichi nuclear reactor". Nippon Kikai Gakkai-Shi, 116(1139), 1 page (Abstract).

Hirose, Shigeo, Hidetaka Ohno, Takeo Mitsui, and Kiichi Suyama. "Design of in-pipe inspection vehicles for/spl phi/25,/spl phi/50,/spl phi/150 pipes." In Proceedings 1999 IEEE International Conference on Robotics and Automation (Cat. No. 99CH36288C), vol. 3, 2 page (abstract). IEEE, 1999.

Hun Ok Lim, Taku Oki, Development of Pipe Inspection Robot, ICROS-SICE International Joint Conference, 2 pages (Abstract), 2009.

(56) References Cited

OTHER PUBLICATIONS

Hyun, J. M., J. L. Hvung, M. L. Young, J. P. Juang, K. Byungkyu, and H. K. Soo. "Magnetic impact actuator for robotic endoscope." In Proc. 32nd Int. Symp. Robotics, Seoul, Korea, 1 page (Abstract). 2001.
Ikuta, Koji, Masahiro Tsukamoto, and Shigeo Hirose. "Shape memory alloy servo actuator system with electric resistance feedback and application for active endoscope." In Proceedings. 1988 IEEE International Conference on Robotics and Automation, pp. 427-430. IEEE, 1988.
Ismail, I. N., Anuar, A., Sahari, K. S. M., Baharuddin, M. Z., Fairuz, M., Jalal, A., and Saad, J. M., 2012. "Development of in-pipe inspection robot: A review". In 2012 IEEE Conference on Sustainable Utilization and Development in Engineering and Technology (STUDENT), IEEE, pp. 310-315.
Jani, Jaronie Mohd, Martin Leary, Aleksandar Subic, and Mark A. Gibson. "A review of shape memory alloy research, applications and opportunities." Materials & Design (1980-2015) 56 (2014): pp. 1078-1113. 36 pages.
Jeon, W., Kim, I., Park, J., and Yang, H., 2013. "Design and control method for a high-mobility in-pipe robot with flexible links". Industrial Robot: An International Journal. 15 pages.
Jinwan Lim, Hyunjun Park, Kaemin An, Yeh-Sun Hong, Byungkyu Kim, Byung-Ju Yi, One Pneumatic line based Inchworm-like micro robot for half inch pipe inspection, Mechatronics, vol. 18, 2 pages (Abstract), 2008.
Jones, Daniel OB, Andrew R. Gates, Veerle Al Huvenne, Alexander B. Phillips, and Brian J. Bett. "Autonomous marine environmental monitoring: Application in decommissioned oil fields." Science of the total environment (2019), pp. 835-853. 19 pages.
Jong-Hoon Kim, Gokarna Sharma, and S. Sitharama Iyengar, FAMPER: A Fully Autonomous Mobile Robot for Pipeline Exploration, IEEE, pp. 517-523, 2010.
Josep M. Mirats Tur and William Garthwaite, Robotic devices for water main in-pipe inspection a survey, Journal of Field Robotics, 27(4), pp. 491-508, 2010.
Jungwan Park, Dongjun Hyun, Woong-Hee Cho, Tae-Hyun Kim, and Hyun-Seok Yang, Normal-Force Control for an In-Pipe Robot According to the Inclination of Pipelines, pp. 5304-5310, 2011.
Kaname Sato, Taku Ohki and Hun-ok Lim, Development of In-Pipe Robot Capable of Coping with Various Diameters, IEEE International Conference on Control, Automation and Systems, 2 pages (Abstract), 2011.
M. Horodinca, I. Dorftei, E. Mignon and A. Preumont, A simple architecture for in-pipe inspection robots. In Proc. Int. Colloq. Mobile, Autonomous Systems, pp. 061-064, 2002.
Manabu Ono and Shigeo Kato, A study of an eartworm type inspection robot movable in long pipes, International Journal of Advanced Robotic Systems, vol. 7, pp. 095-090, 2010.
Mouritz, A. P., Evan Gellert, Peter Burchill, and Karen Challis. "Review of advanced composite structures for naval ships and submarines." Composite structures 53, No. 1 (2001): pp. 21-42.
Nayak, A., and Pradhan, S., 2014. "Design of a new in-pipe inspection robot". Procedia Engineering, 97, pp. 2081-2091.
Oh, Hyondong, Ataollah Ramezan Shirazi, Chaoli Sun, and Yaochu Jin. "Bio-inspired self-organising multi-robot pattern formation: A review." Robotics and Autonomous Systems 91 (2017): pp. 83-100.
Roslin, Nur Shahida et al., "A Review: Hybrid Locomotion of In-pipe Inspection Robot", 2012 International Symposium on Robotics and Intelligent Sensors, Procedia Engineering vol. 41, pp. 1456-1462, Year: 2012, 7 pages.
Se-gon Roh and Hyouk Ryeol Choi, Differential-drive in-pipe robot for moving inside urban gas pipelines, IEEE Transactions on Robotics, vol. 21, pp. 1-17, 2005.
Shukla, A. and Karki, H., "Application of robotics in offshore oil and gas industry—a review part II," Robotics and Autonomous Systems 75, pp. 508-524 (2016).
Shukla, Amit, and Hamad Karki. "Application of robotics in onshore oil and gas industry—A review Part I." Robotics and Autonomous Systems 75 (2016): pp. 490-507.
Sun, Yushan, Xiangrui Ran, Guocheng Zhang, Fanyu Wu, and Chengrong Du. "Distributed control system architecture for deep submergence rescue vehicles." International Journal of Naval Architecture and Ocean Engineering 11, No. 1 (2019): 274-284. 11 pages.
Suzuki, Shunichi. "Overview of research on Fukushima Daiichi decommissioning at the University of Tokyo." Hozengaku (Online) 17, No. 4 (2019): 2 pages (abstract).
Tourajizadeh, H., Rezaei, M., and Sedigh, A., 2018. "Optimal control of screw in-pipe inspection robot with controllable pitch rate". Journal of Intelligent & Robotic Systems, 90(3-4), pp. 269-286.
Vas, Peter. Sensorless vector and direct torque control. Oxford Univ. Press, 1998, 2 pages (Abstract).
Vedachalam, N., Ramesh, R., Jyothi, V. B. N., Doss Prakash, V., and Ramadass, G., 2019. "Autonomous underwater vehicles—challenging developments and technological maturity towards strategic swarm robotics systems". Marine Georesources & Geotechnology, 37(5), pp. 525-538.
Venkateswaran, S., Chablat, D., and Boyer, F., 2019. "Numerical and experimental validation of the prototype of a bio-inspired piping inspection robot". Robotics, 8(2), pp. 1-19.
Wang, H., Han, Z., and Ma, Q., 2019. "Robotic system with power line communication for in-pipe inspection of underground urban gas pipeline". In 2019 4th International Conference on Robotics and Automation Engineering (ICRAE), IEEE, 2 pages (Abstract).
Werner Neubauer and Siemens AG, A spider-like robot that climbs vertically in ducts or pipes, Intelligent Robot and Systems '94, 1994, 2 pages (Abstract).
Yanheng Zhang, Mingwei Zhang, Hanxu Sun, Design and Motion Analysis of a Flexiible Squirm Type Robot, IEEE Int. Conference on Intelligent System Design and Engineering Application, 2 pages (Abstract), 2010.
Ying, Xiong, Hu Jun Jie, and Tang Di. "Research of Submarine Hovering based on Fuzzy Control." International Journal of Control and Automation 8, No. 12 (2015): pp. 273-282. 10 pages.
Young-Sik Kwon, Bae Lee, In-Cheol Whang, Whee-kuk Kim and Byung-Ju Yi, A Flat Pipeline Inspection Robot with Two Wheel Chains, IEEE International Conference on Robotics and Automation, pp. 5141-5146, 2011.
Young-Sik Kwon, Byung-Ju Yi, Design and Motion Planning of a Two-Module Collaborative Indoor Pipeline Inspection Robot, IEEE, pp. 1-16, 2012.
Zanlongo, Sebastian A., Leonardo Bobadilla, Dwayne McDaniel, and Yew Teck Tan. "Development of Informative Path Planning for Inspection of the Hanford Tank Farm." In 2019 International Conference on Robotics and Automation (ICRA), pp. 2297-2303. IEEE, 2019. 7 pages.

\* cited by examiner

MODULAR ROBOTIC CRAWLER WITH HYBRID LOCOMOTION FOR INSPECTION OF SMALL DIAMETER PIPE

PRIORITY STATEMENT

This application claims priority to U.S. Provisional Patent Application No. 62/937,649 filed on Nov. 19, 2019 titled A Modular Robotic Crawler with Hybrid Locomotion for Inspection of Smaller Diameter Pipe all of which is hereby incorporated by reference in their entirety.

FIELD OF THE INVENTION

The present disclosure relates to inspecting piping systems. Particularly, the present disclosure relates to inspecting piping systems having smaller diameters, such as, by way of example only, diameters of less than five inches. More particularly, but not exclusively, the present disclosure relates to a modular robotic crawler robot with hybrid locomotion for inspection of small diameter pipe.

BACKGROUND

Currently, state-of-the-art pipe inspection robots are limited to inspection tasks using lightweight tools, such as cameras. This is due to the limited availability of the pull force inside smaller diameter pipes (i.e., less than 5 inches), in which the size of the actuators limit a robot's load carrying capability. Greater load capacities allow for more advanced maintenance tasks, such as the deployment of in-pipe nondestructive testing and evaluation (NDT&E) technologies and the automated repair via conducting additional mechanical maintenance tasks.

Typical inchworm robots consist of separate functions for longitudinal and radial actuation using an inchworm algorithm for moving inside a small diameter pipe (i.e., less than 5 inches).

Pipeline installations are of great importance in various marine engineering and undersea applications. Depending on the application, the type and complexity of the piping installations vary in terms of configuration (e.g., diameters, joints and branches), environment (e.g., gas, deposits and corrosion) and exposure to biological and radioactive (e.g., gamma and beta) risks. Robots can be deployed for preventative measures including persistent, autonomous inspection of critical nuclear submarine infrastructure. They are particularly advantageous because they give access to components and areas not readily accessible to human inspectors.

The disasters in the Fukushima-Daiichi power plant, the Russian Kursk submarine, the Deepwater horizon oil spill and the DOE (Department of Energy) Handford tank farm nuclear waste leakage are among the incidents demonstrating the need for better inspection robotic tools to effectively inspect both nuclear and non-nuclear facilities, assess damage and take proper actions to manage problems. In recent years, the use of robotic systems has been considered for automating inspection and maintenance processes, and many inspection robots have been developed for marine and nuclear applications. However, a robot navigating inside a small diameter piping system, such as trim and drain piping, is subjected to various unique challenges, which the existing pipe inspection robots are incapable of addressing properly. These include: (i) maintaining a stable locomotion of the robot; (ii) avoiding obstacles and sudden diameter changes; (iii) positioning and retrieving the robot; (iv) ensuring the reliable operation of the robot; (v) nondestructively inspecting pipe interiors and (vi) effectively carrying equipment and conducting mechanical tasks including inspection, welding and cleaning. Due to these challenges, autonomously inspecting and repairing narrow diameter complex pipelines is yet to be demonstrated.

It has been shown that applying design concepts mimicking the capabilities and processes found in living creatures can impart robots with unique abilities. Bioinspired locomotion techniques have yielded robots capable of operating in water, air, on land and, in some cases, transitioning between different media. Some of the existing robots with mechanical locomotion systems employ wheels and pulleys, and telescopic, impact (or) natural peristalsis. Some of the bioinspired robots use locomotion principles mimicked from earthworms, snakes, millipedes, lizards, caterpillars, or an octopus.

SUMMARY

Therefore, it is a primary object, feature, or advantage of the present disclosure to improve over the state of the art.

It is a further object, feature, or advantage of the present disclosure to provide an innovative robot design.

It is a further object, feature, or advantage of the present disclosure to provide an innovative navigation algorithm.

It is a further object, feature, or advantage of the present disclosure to provide improvements in the gripping function.

It is a further object, feature, or advantage of the present disclosure to utilize the modules' optimal, lightweight design and usage of additive manufacturing to provide significant improvements in radial traction and the ability to provide a maximum pull force.

It is a further object, feature, or advantage of the present disclosure to provide an innovative candidate for piping inspection, non-destructive inspection and mechanical repairs tasks.

It is a further object, feature, or advantage of the present disclosure that the proposed robot include an inspection mechanism equipped with a computer vision camera and a radially actuated nondestructive evaluation module capable of conducting vision-based and guided waved-based inspection for detection of surface and under-surface damages.

It is a further object, feature, or advantage of the present disclosure that the robot design includes hybrid modules with a capability of both gripping and motion actuation.

It is a further object, feature, or advantage of the present disclosure that the biomimetic design of the robot not only provides significant traction in pipe walls to allow it to carry NDE equipment, but it also supports multi-scale mechanism tasks.

It is a further object, feature, or advantage of the present disclosure that the proposed pipe inspection crawler can perform a gripping action using radial motions to adjust to variations of diameters less than 5 inches inside pipes sloped from 0 to 180 degrees.

It is a further object, feature, or advantage of the present disclosure that the legged mechanism of the proposed pipe inspection crawler is optimal for navigating changes in the internal profile of piping seen in joints, bands, valves and T-joints and step changes.

It is a further object, feature, or advantage of the present disclosure that the robot is manufactured using an additive manufacturing process.

A system for inspection of a pipeline in aspects of the present disclosure may have one or more of the following: (a) a self-propelled robot comprising, (i) a plurality of modules, at least one of said modules having a drive mechanism for peristaltic movement of said robot, (ii) at least one joint member for interconnecting adjacent modules in said robot, said joint member configured to allow articulation of said modules relative to each other through multiple planes and angles, said at least one joint member comprising at least one steerable spring positioned on a first module and connected to a second module, (iii) a camera, (iv) a stepper motor operably coupled to each of said modules, (v) at least one expandable foot extending between an actuator and a follower section of the modules, (vi) a gripping mechanism operably coupled on the expandable foot, and (vii) a friction pad operably coupled to the gripping mechanism.

A modular pipe-crawling robot for in-pipe maintenance operations in aspects of the present disclosure may have one or more of the following features: (a) at least two locomotion modules, (b) each module has feet which can extend outward to grip a wall of a pipe while simultaneously reducing its length or disengaging its feet from the inner wall while increasing its length 20, (c) a gear mechanism 26 built into mechanical linkage, wherein each module's feet are held perpendicular with respect to the inner wall of the pipe, and (d) a joint coupling the at least two modules.

A modular pipe-crawling robot for in-pipe maintenance operations in aspects of the present disclosure may have one or more of the following: (a) a hybrid gripping module, (b) a gripping mechanism comprising at least two legs operably coupled to the gripping module, (c) a motor actuator 102 having rotational motion can provide linear motion for a follower section of the module, (d) linkage mechanisms located at geared middle joints have friction pads and are operably coupled to the follower 32, wherein the linkage mechanisms apply force to an internal piping surface to generate traction, and (e) a joint which couples adjacent modules.

One or more of these and/or other objects, features, or advantages of the present disclosure will become apparent from the specification and claims that follow. No single aspect need provide every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein.

Figure 1:
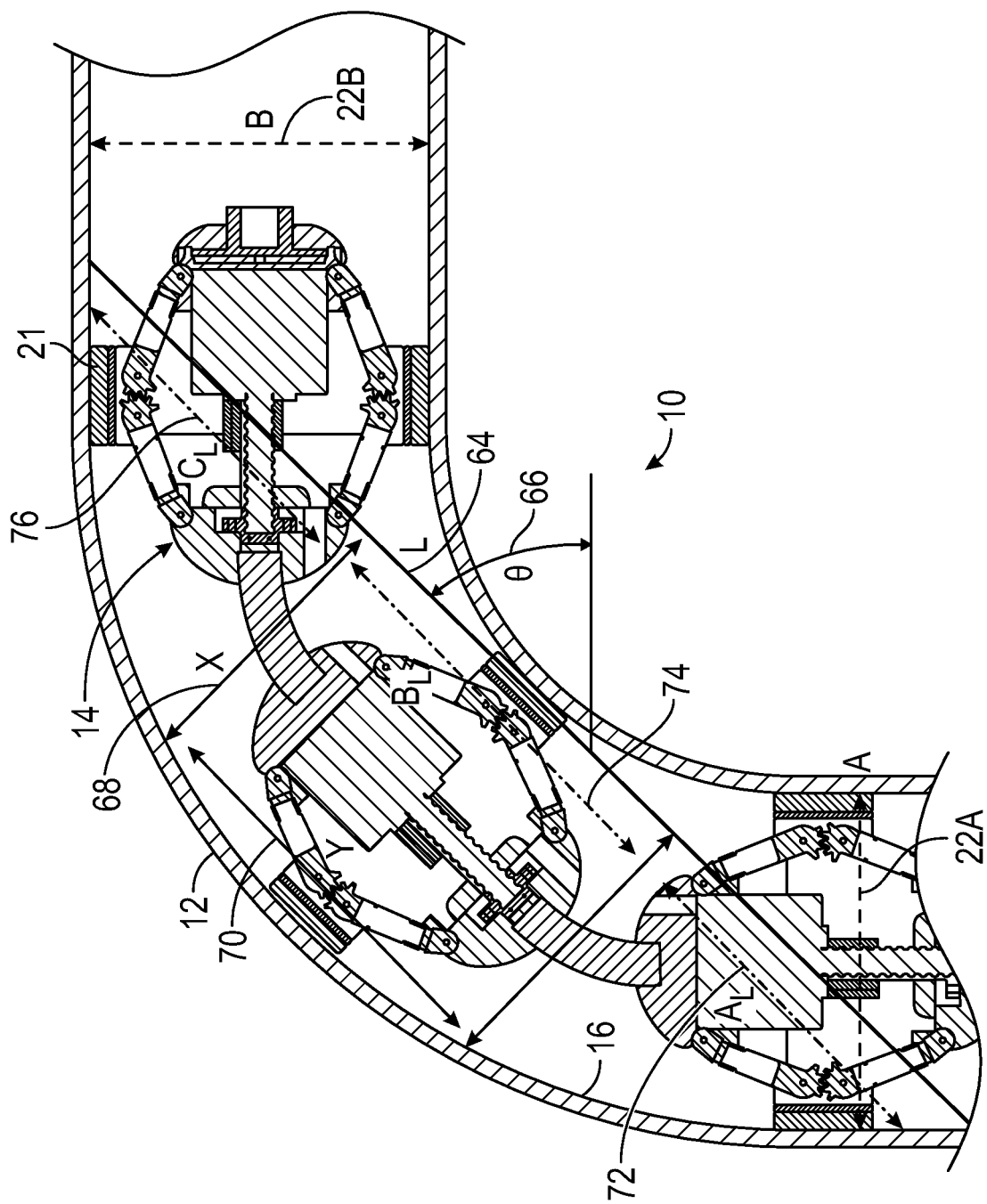
FIG. 1 is a pictorial representation of a maximum feasible dimension of a module moving around a bend with variable corridor diameters in accordance with an aspect of the disclosure.

Some of the figures include graphical and ornamental elements. It is to be understood the illustrative aspects contemplate all permutations and combinations of the various graphical elements set forth in the figures thereof.

DETAILED DESCRIPTION

The following discussion is presented to enable a person skilled in the art to make and use the present teachings. Various modifications to the illustrated aspects will be clear to those skilled in the art, and the generic principles herein may be applied to other aspects and applications without departing from the present teachings. Thus, the present teachings are not intended to be limited to aspects shown but are to be accorded the widest scope consistent with the principles and features disclosed herein. The following detailed description is to be read with reference to the figures, in which like elements in different figures have like reference numerals. The figures, which are not necessarily to scale, depict selected aspects and are not intended to limit the scope of the present teachings. Skilled artisans will recognize the examples provided herein have many useful alternatives and fall within the scope of the present teachings. While aspects of the present disclosure are discussed in terms of piping systems less than five inches in diameter, it is fully contemplated aspects of the present disclosure could be used in most any conduit system without departing from the spirit of the disclosure.

In the present disclosure, the inventors developed a bio-inspired pipe inspection robotic crawler mimicking a peristaltic movement using an electromechanical design as represented pictorially in FIGS. 1-10. The crawler could be inserted in the trim and drain piping system from an inlet point and travel inside the pipe under external supervision. The crawler is designed using a modular concept of hybrid legged-inchworm locomotion for maximizing load carrying capacity, obstacle avoidance and flexibility of additional development though introducing new modules. The crawler semi-autonomously conducts an inspection by connecting a tether cable to the operator at a remote location. This disclosure presents the robotic pipe crawler and options for integration of pipeline structural health monitoring (SHM) techniques by introducing a sensor-less control method for gripping varying pipe diameters and a new steering mechanism using shape memory alloy (SMA) tension springs for active navigation. One of the purposes of the crawler is to integrate full autonomy for both navigation and maintenance tasks.

The pipe inspection robotic crawler is designed with a modular system that may feature several pill-shaped locomotion segments linked end to end. Inspection and or repair modules can be encased in a similar pill-shaped enclosure and inter-spaced between the locomotion modules. A payload that fits a required form factor and power consumption limitations can be adapted to work with this system. The design of the pipe inspection robotic crawler can increase the available traction through additional locomotion modules within reason. The design of the pipe crawling robot may allow the pipe crawling robot to be easily repaired, modified, or scaled to cover a wide variety of pipe diameters.

Figure 2:
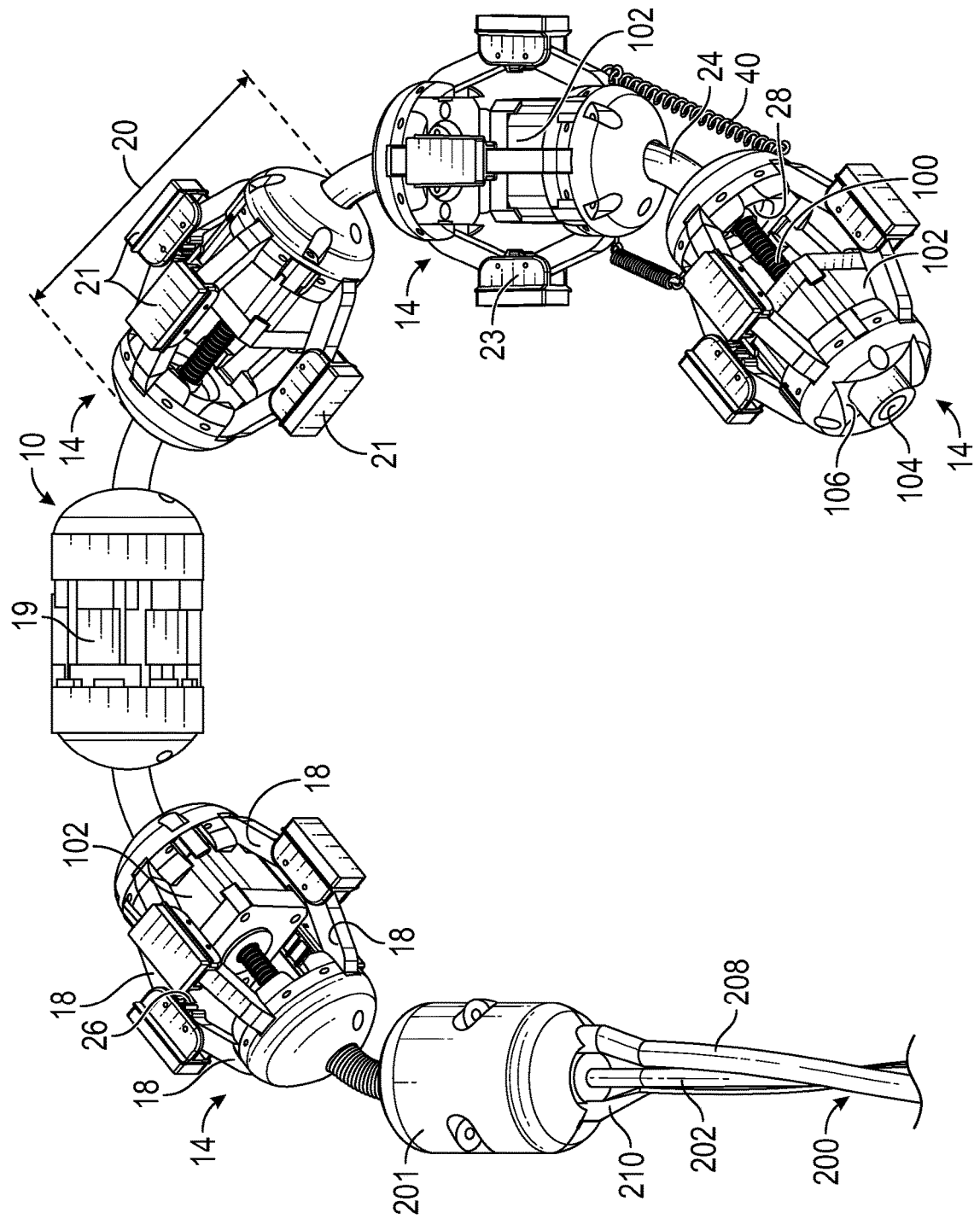
FIG. 2 is a pictorial representation of components of the pipe crawling robot with hybrid peristaltic locomotion and modular inspection concept in accordance with an aspect of the present disclosure.
Figure 3:
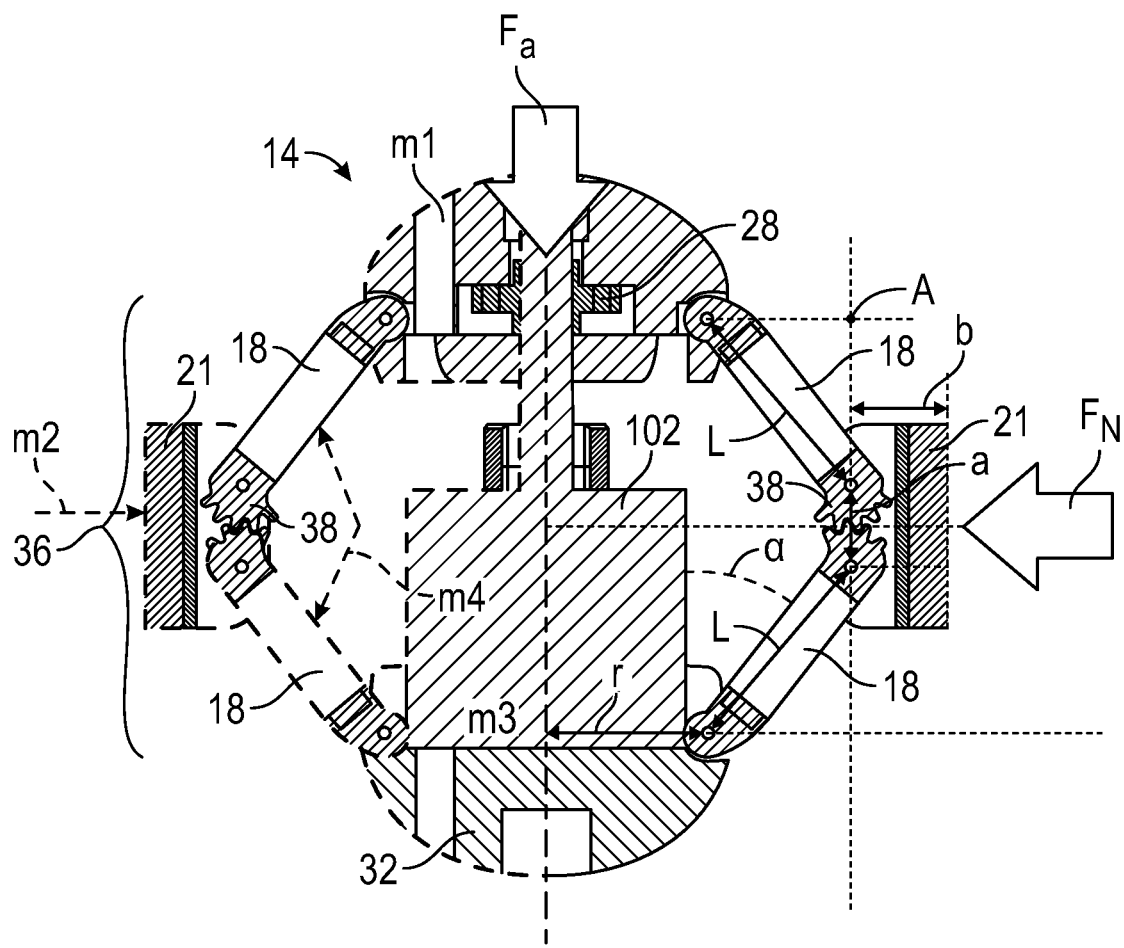
FIG. 3 is a pictorial representation of a hybrid gripping module in accordance with an aspect of the present disclosure.

With reference to FIGS. 1-3 a pictorial representation of a pipe crawling robot 10 with modular concepts in accordance with an aspect of the present disclosure is shown. A specific aspect of the present disclosure relates to a modular pipe-crawling robot 10 for in-pipe maintenance operations, including the inspection and repair of both non-complex and, more specifically, complex piping systems 12 with varying, small-sized (i.e., less than 5") diameters 22. At least one design of the robot 10 is configured with four nearly identical locomotion modules 14. In one example, each module 14 has four feet 21 that can be extended outwards to grip the walls 16 of the pipe 12 while simultaneously reducing its length 20 or disengaging its feet 21 while increasing its length 20. Adjoining feet 21 are operatively connected by a base component 23. The distance the feet 21 are extended can be varied to conform to variable piping diameters 22. Through a gear mechanism 26 built into the mechanical linkage, each module's feet 21 are held perpendicular with respect to the inner walls 16 of the pipe 12 to improve grip. The range of traversable internal diameters go from the diameter of each module's 14 core element plus the thickness of two footpads at a minimum to the fullest radial extension of the module 14 at a maximum.

At least one innovation of the design eliminates the need for separate mechanisms for gripping the pipe 12 and forward movement. Each module 14 offers a hybrid gripping and extending function, allowing more modules 14 to grip the pipe 12 at once. The mechanics of the modules 14 are a hybrid of legged and inchworm approaches. Forward (or backwards) movement can be produced by simultaneously extending and contracting adjacent modules 14. This motion was inspired, at least in part, by natural peristalsis, seen in the movement of worms through soil. Each module 14 may be mechanically independent, with a single motor actuator 102 for adjusting each of the module's feet 21 position and allowing the module 14 to grip the pipe wall. The motor actuator 102 could be electrically driven, pneumatically driven, magnetically driven, and/or hydraulically driven. While all the modules 14 are connected via compliant joints 24, the front two modules 14 are connected by an additional active joint 24. The active joint 24 can be configured of four shape-memory alloy springs surrounding the passive joint 24. When a spring 40 (FIG. 5) is heated by an electrical current, it contracts and pulls the first module 14 in its direction. The electrical current may vary for each spring 40. This allows the crawler 10 to steer itself through branches in a pipe network. The springs 40 may be isolated to help dissipate the heat. The proposed concept was experimentally verified through building a prototype of the crawler 10 using additive manufacturing and experimentally validating the navigation inside a test setup. The performance of the concept was successfully demonstrated inside the test set-up's complex piping comprised of horizontal and vertical pipes with variable diameters 22, joints, bandings, and reductions. The robot 10 presented a reliable locomotion inside the complex configuration; it avoided obstacles such as sudden changes, it moved in both upward and downward directions with adjustable gripping forces, and it demonstrated accurate positioning and reliable retrieval.

In an aspect of the present disclosure, the design, control and experimental validation of the new robotic pipe crawler 10 for autonomous inspection of remote-to-access piping 12 is disclosed. Many current in-pipe inspection robots are primarily designed and suitable for large diameter pipes and unreliable for pipes 12 less than 5 inches (12.70 cm) in diameter 22. The small size of the robot 10 gives rise to problems with insufficient power, propulsion, structural integrity and difficulty of control, guidance, and navigation. To address these challenges, a modular design of the crawler 10 with a hybrid, legged-peristaltic movement has been designed and developed with the capability of navigating, inspecting, and carrying additional sensor payloads and mechanical equipment. A crawler prototype and the results of experimental testing and validation are discussed here within. In addition, the sensor-less control systems used to grip variable pipe diameters 22 and the development of a new mechanism to actively navigate through pipe branches is discussed as well. The innovative hybrid design of the modular robot 10 offers a unique combination of payload carrying and coping with pipe diameter 22 varying and capability of clearing obstacles not existing in current in-pipe inspection robots. These attributes are essential for small diameter 22 yet complex piping 12 configuration applications for example in nuclear submarine trim and drain systems and for identifying and localizing various pipe damage through conducting proper nondestructive testing techniques.

Also shown in FIG. 2, is a lead screw 100 utilized by the stepper motor 102 to expand and contract the length of module 14. Module 14 also has a camera 104 which can be utilized to visually inspect piping systems 12. A swivel joint 106 allows a user to move the camera in a 360° rotation, thus the orientation of the module is irrelevant to the user as they can rotate the swivel joint 106 to allow various points of view in for inspection, navigation and repairs.

It is well known that surface cracks are caused by excessive erosion through a pipe wall. For example, in modern submarines, a network of pipes and tanks are used for trim and drain function to control the descent, ascent, and cruising depth via balancing the buoyant force. Due to superior corrosion resistant properties, copper-nickel (Cu—Ni) alloys are used in the drain and trim piping system. These pipes are difficult to access and exposed to corrosive seawater repetitively. They are subjected to harsh operational conditions such as extreme temperature and pressure, humidity, dust, and vibration. Over time, these unfavorable conditions can lead to problems in pipes such as corrosion and erosion, deposition, pitting, surface cracks, thermal cycling, joint failure, etc.

These pipes and storage tanks need regular maintenance. Human inspection of these components is expensive, time consuming and hazardous; therefore, automation of inspection and maintenance for these components is desired. Traditional methods of maintenance require a complete overhaul of submarines for dismantling, obtaining manual access and conducting the inspection. A variety of nondestructive testing and evaluations (NDT&E) methods are used for detecting the presence and position of these flaws for trim and drainpipes. Aspects of the present disclosure disclose a new in-pipe inspection robotic crawler 10 to address this problem. The crawler 10 can be inserted in the trim and drain piping system from an inlet point and travel inside the pipe 12 under external supervision.

The crawler 10 is designed and configured using a modular concept of hybrid legged-inchworm locomotion for maximum load carrying capacity, reliability, and flexibility of further development. The proposed crawler 10 is tethered and capable of semi-autonomously conducting an inspection at a remote location. The robot crawler 10 contemplates complete autonomy for navigation, inspection, and repair. This can be achieved through recent advances in machine learning and sensor fusion.

With reference to FIG. 1, a pictorial representation of a maximum feasible dimension of a module 14 moving around a bend with variable corridor diameters 22A, 22B is pictorially illustrated in accordance with an aspect of the present disclosure. The maximum length and width of an individual module 14 to move around bending segments of pipes 12 are related to each other. To find these values, the length 64 of a narrow rod passing through a pipe bending with entrance diameters A (22A), and B (22B) (shown in FIG. 1), the length L (64), should be minimized within the terms of the angle θ (66). Where L (64) is made up of components $A_L$ (72)+$B_L$ (74)+$C_L$ (76), where $B_L$ (74) is equal to Y (70).

The length L (64), can be formulated by being expressed in terms of the angle θ (66), formed between the wall and the rod:

$$L = \left(\frac{A}{\cos\theta} + \frac{B}{\sin\theta}\right) \quad (1)$$

To minimize the length L, (64), in terms of the angle θ (66), the derivative $$\frac{dL}{d\theta}$$

is calculated and set equal by zero. So, the angle θ (66) is found as:

$$\theta = \arctan\left(\frac{B}{A}\right)^{\frac{1}{3}} \quad (2)$$

By substituting θ (66) back into the original equation, the maximum length L (64) will be obtained as follows:

$$L = \left(A^{\frac{2}{3}} + B^{\frac{2}{3}}\right)^{\frac{3}{2}} \quad (3)$$

According to the geometry shown in FIG. 1, the dimensional requirement of a cylindrical module in terms of its diameter X (68) and length Y (70) is found as:

$$L = x\tan\theta + y + \frac{x}{\tan\theta} \quad (4)$$

This concludes dimensions of the modules are related to each other and choosing one will dictate the other.

To find the work done by the robot per movement cycle, a dynamic analysis based on Lagrangian principles is employed. In the movement gait of the robot, each extending or contracting module may have one fixed end. The module is divided into four sections, each with their own mass and inertia, m1, m2, m3 and m4 as shown in FIG. 3. For example, the Lagrange equation is used to obtain the dynamic model. In this case, the module has 1 DOF, and a generalized coordinate was chosen as q=[a]. Kinetic energy is found as:

$$T = \sum_i \left(\frac{1}{2}m_i\bar{v}_i^2 + \frac{1}{2}\bar{I}_i w_i^2\right) \quad (5)$$

where $\bar{v}_i$ is the velocity of the COM (center of mass) of the link $\bar{i}$, $I_i$ is its moment of inertia, $w_i$ is its angular velocity, and $h_i$ is the vertical position of COM of link i.

The potential energy can be found as:

$$T = \sum_i (m_i g h_i) \quad (6)$$

where g is the acceleration due to gravity.

Using the Lagrange equation, the dynamic model of the system in can be found as:

$$D(q)\ddot{q} + C(q,\dot{q}) = Bu \quad (7)$$

where D is the inertia scalar, C contains Coriolis, centrifugal, and gravity effects, B is the input scalar obtained using virtual work, and u is motor torque. This is then utilized in an inverse dynamics problem to calculate the required motor torque in each instance of a planned motion. The motion starts from the fully extended mode of the module (α=5 deg) until the feet touch the pipe wall 16, such as when the pipe has a 4-inch diameter. This leads to Eq. (8).

$$r + L \sin \alpha_2 + b = 2 \cdot 0.0254 \quad (8)$$

The initial and final vertical positions of the lower base $y_1$ and $y_2$ are calculated corresponding to $a_1$ and $a_2$, respectively. The work done per unit distance traveled by the robot base can be found as:

$$W = \frac{\int u d\varphi}{y_2 - y_1} \quad (9)$$

in which j is the rotation angle of t the motor output shaft. The constraint α2≤80_ arises from practical limitations of the real robot. This optimization problem converges to a result that generates α=80_ with optimal parameters of L=26:1 mm, r=15:1 mm, and a=20 mm for one aspect of the present disclosure. The parameter a does not affect W and remains at its initially defined value. The parameters L and r converge to small values to generate α2 as large as possible.

There are pipes 12 of various shapes and sizes involved in the trim and drain piping system of submarines according to usage and flow fluids. Therefore, the shape and size of the individual modules 14 of the crawler 10 are designed to allow gripping in variable diameter pipes 12, avoid obstacles and generate maximum friction as shown in FIG. 2.

With reference to FIG. 3, a pictorial representation of a hybrid gripping module 14 in accordance with an aspect of the present disclosure is shown. The crawler 10 introduces a new hybrid gripping mechanism 26 incorporating the advantages of both legged and wall-press concepts. In the design for the gripper mechanism 38, the rotational motion of the motor actuator 102 is converted into the linear motion of the follower 32. Four linkage mechanisms 36 (the upper and lower mechanisms not shown) are connected to the follower 32 with friction pads, such as feet 21, installed in the geared middle joints (base) 38 of the feet 21. Together, they apply the normal force to the internal piping surface 16 to generate the required traction. The innovative design of the modules 14 combines both longitudinal and radial motions and, therefore, has led to]/low weight, simplicity, and versatility. The linear actuating force could be found from the formula to calculate the torque required to lift or lower a load using a lead screw 100. This calculation can be conducted in terms of the parameters of the lead screw to obtain the lowering torque $T_L$ or raising torque $T_R$ as:

$$T_{L/R} = \frac{Fd_m}{2}\left(\frac{\mp l + \pi f d_m \sec(\alpha_n)}{\pi d_m - fl\sec(\alpha_n)}\right) + T_c \qquad (10)$$

in which, −1 corresponds to $T_L$ and +1 corresponds to $T_R$, and f is the coefficient of friction between the threaded rod 100 and the traveling nut 28. In other aspects of the present disclosure, movement imparted to the traveling nut 28 by the threaded rod 100 could be accomplished using a pneumatic actuator, electrical actuator, hydraulic actuator, magnetic actuator, or other suitable actuator. The mean diameter ($d_m$), the normal pressure angle ($\alpha_n$), and the lead angle (θ) can be found as:

$$d_m = d - \frac{p}{2} \qquad (11)$$

$$\alpha_n = \tan^{-1}\xi \qquad (12)$$

$$\tan\{\theta\} = \frac{l}{pd_m} \qquad (13)$$

where α is the half of the thread angle.

A static analysis reveals the relation between the actuating force ($F_a$) and the normal reaction force ($F_N$) at the contact point of each claw with the pipe:

$$F_N = F_a \tan(\alpha) \qquad (14)$$

Figure 4:
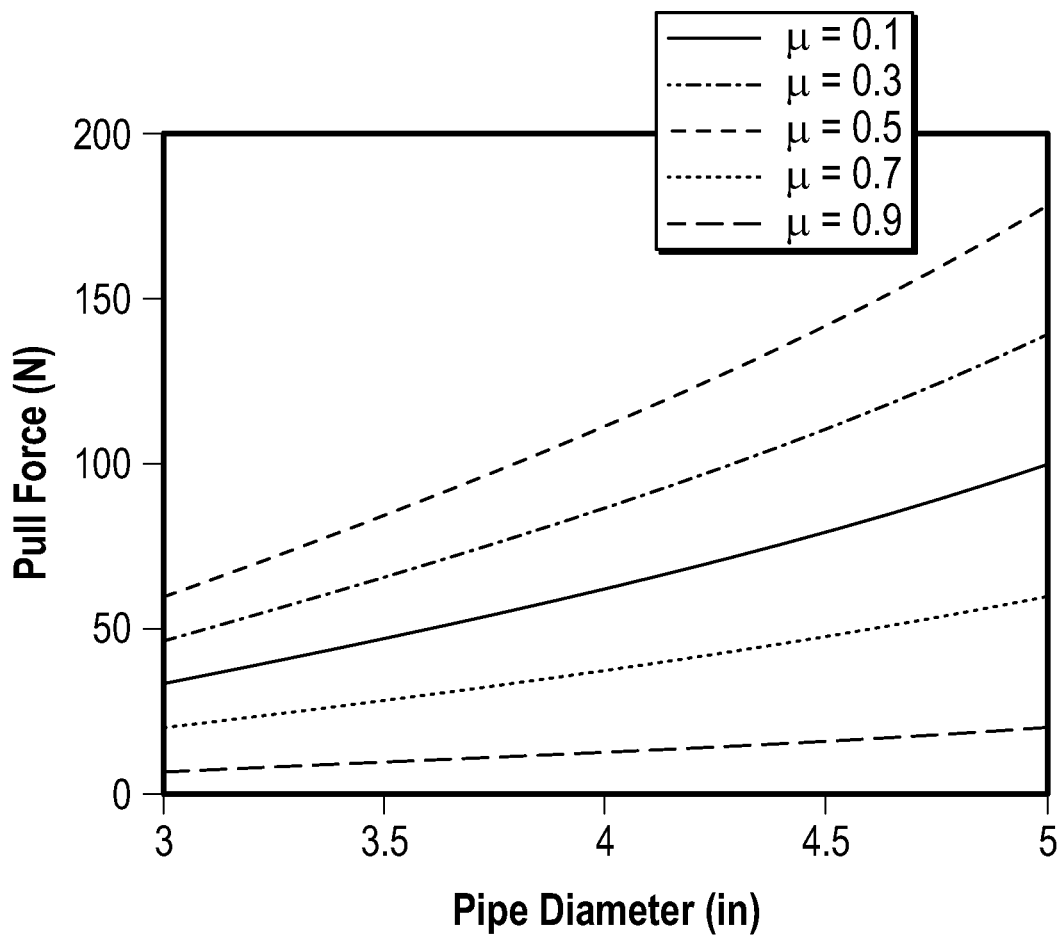
FIG. 4 is a graphical chart of pull force versus pipe diameter for various coefficients of friction between the pipe and claws in accordance with aspects of the present disclosure.

With reference to FIG. 4, a graphical chart of pull force versus pipe diameter for various coefficients of friction between the pipe and claws in accordance with aspects of the present disclosure is shown. The overall pull force of the crawler 10 depends on the number of feet 21 in contact with the pipe wall 16, the normal reaction force, and the coefficient of friction as shown in FIG. 4. The differences in pipe diameter 22 results in variation of angle α and therefore the reaction force and the overall pull force.

Figure 5:
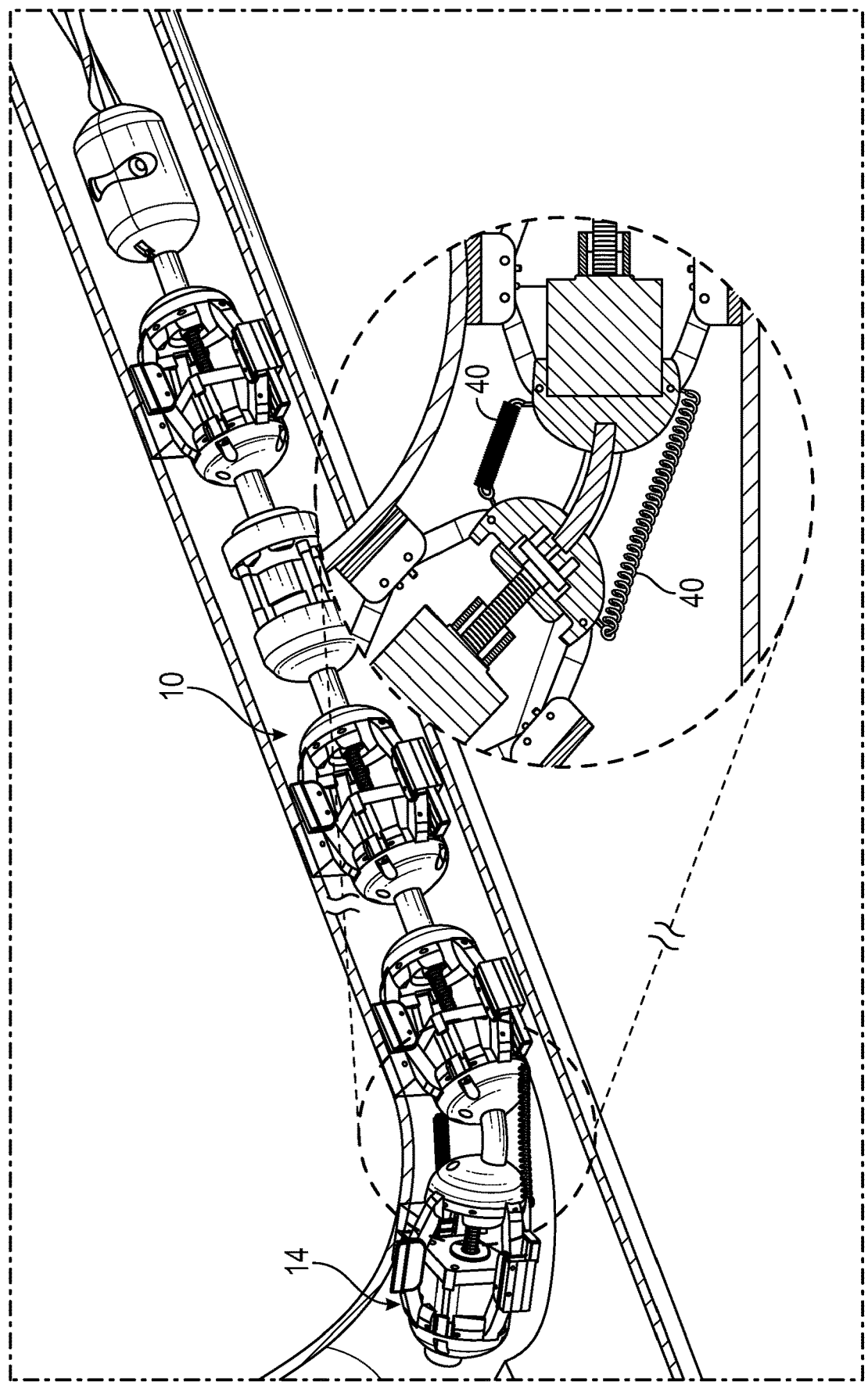
FIG. 5 is a pictorial representation of an articulated steering mechanism using single acting Nitinol SMA tension springs in accordance with an aspect of the present disclosure.

With reference to FIG. 5, a pictorial representation of an articulated steering mechanism using single acting Nitinol SMA tension springs in accordance with an aspect of the present disclosure is shown. Most pipe inspection robots are designed to pass through straight, horizontal pipelines. However, the trim and drain system of submarines have complex piping structures requiring the crawler to actively steer through complex shapes such as vertical pipes, elbows, T-joints and angled branches in piping with varying diameters. For the robot 10 to navigate through T-joints and branches, an articulated steering mechanism, shown in FIG. 5 using Shape Memory Alloy (SMA) 40, is used to allow the robot 10 to take turns in restricted spaces, such as, for example only, near 90 degree turns.

In the current design of the crawler 10, the modules 14 connect with flexible spring segments 40. This reduces the overall size and satisfies the dimensional requirements of the robot 10. Moreover, it has enabled successful navigations through various piping configurations such as vertical piping and various fittings such as joints, elbows, and reductions. There are several possible kinds of articulated steering mechanisms, such as steering point, flexible intermodule linkages, double-active universal joints, and active materials. SMA tension springs 40 were used as opposed to the alternatives because of their low weight and mechanical simplicity. This turning system allows the pipe crawling robot complete control of the angle of its front-most module within, for example, a 50-degree cone originating from the center line of the previous module.

With reference to FIGS. 6A-6D, a graphical representation of peristaltic movement used to generate forward motion in accordance with an aspect of the present disclosure is shown. In-pipe inspection robots have been built based on wheeled type, caterpillar type, snake type, legged type, inchworm type, screw type, and PIG type concepts. While wheel-based robots have advantages such as easy speed and differential direction control, they suffer from the complexity of the steering mechanism and instability during navigation. In addition, the wheel-based robots get stuck inside the pipe when there are sharp corners, steps, and sudden changes in pipe diameter. Recently, combination of two or more locomotion systems have been implemented to pipe inspection robots for more advantages in term of robustness and flexibility. By using a hybrid locomotion system, the inspection robot 10 can adapt and navigate in a various pipe configuration. The robotic crawler 10 uses a hybrid of legged and inchworm types like peristaltic locomotion for navigating inside the pipe as shown in FIGS. 6A-6D. Peristalsis is common in small, limbless invertebrates such as worms, where they need to deform their body to create the essential processes of locomotion. In the design of the new crawler 10, two adjacent modules 14 are engaged in motion at any time. Simultaneously, one of the modules 14 elongates, the second module 14 contracts while expanding radially and the forwarding motion is generated via advancing the clamping point forward as shown in FIGS. 6A-6D. Backward motions are also possible simply by reversing the sequence.

Figure 6A:
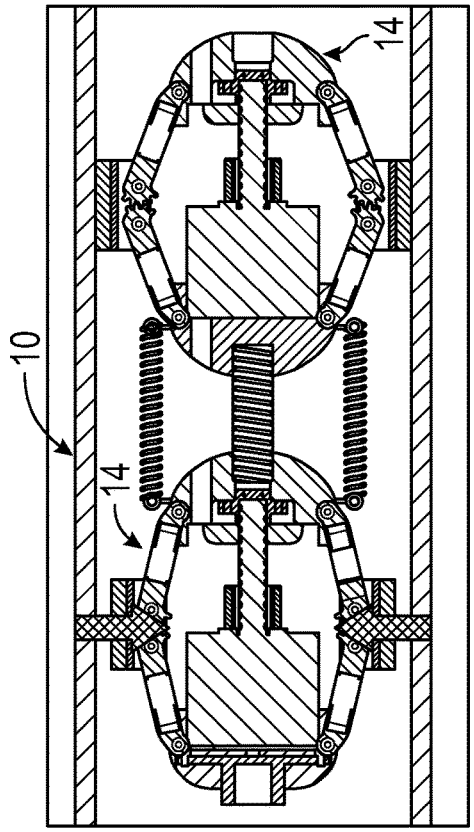
FIGS. 6A-6D are graphical representations of peristaltic movement used to generate forward motion in accordance with an aspect of the present disclosure.
Figure 6C:
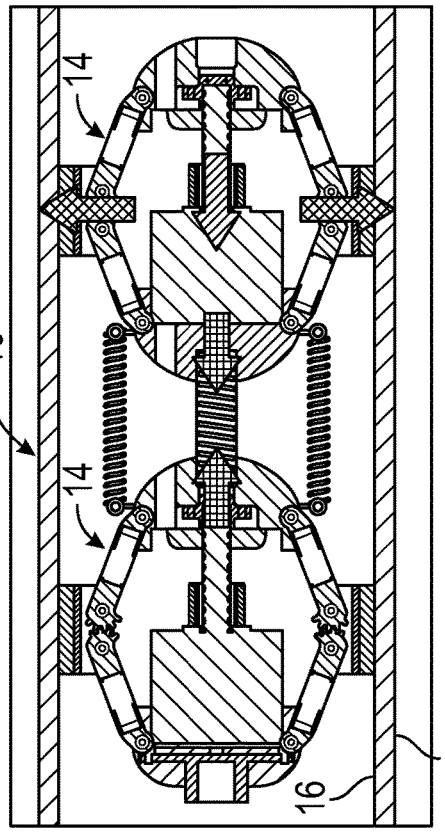
Figure 6B:
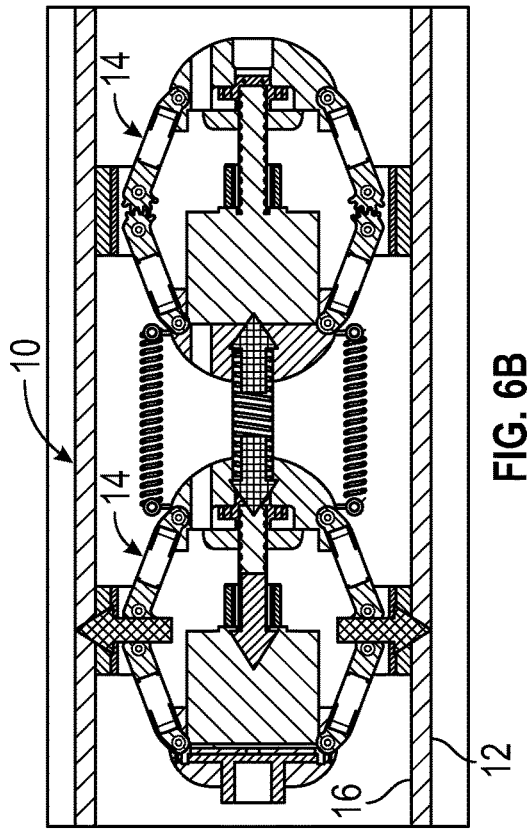
Figure 6D:
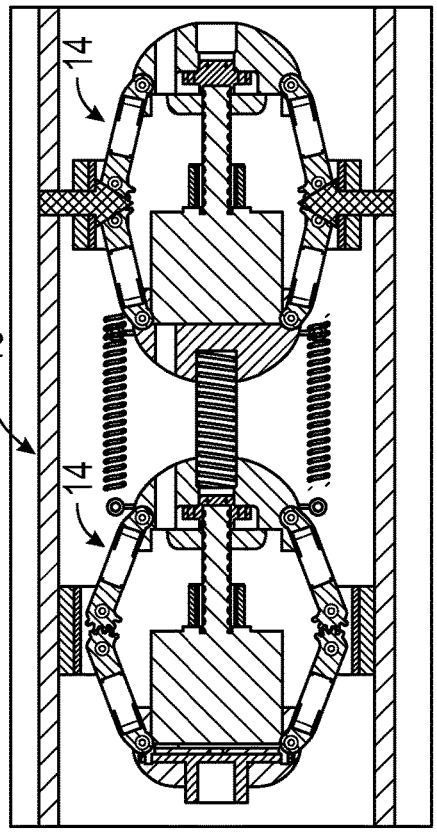

In accordance with at least one or modes of operation, starting from an initial stage with one or more or all modules 14 radially expanded, the first module 14 radially contracts (FIG. 6A) and the robot 10 elongates (FIG. 6B). Following this, the first module 14 radially expands to clamp against the inner wall 16 of the pipe 12 (FIG. 6B) and the second module 14 radially contracts (FIG. 6C), the robot 10 contracts moving the second module 14 forward, and the second module 14 radially expands to clamp against the inner wall 16 of the pipe 12. At the end of these operations, the clamping point of the first module 14 and the subsequent clamping point of the second module 14 would have advanced forward a distance through the pipe. This operation is then repeated for every module 14. In at least one aspect, there can be at least three locomotion modules 14 whereby at least one module 14 grips the inner wall 16 of the pipe 12 while the other modules 14 are in a transitional state. For example, four modules 14 is the more suitable minimum however as when traversing intersections the module 14 currently in the intersection is likely not able to reliably contribute to locomotion. Backward motion is also possible by reversing the sequence of contractions and expansions of the modules 14 of the robot 10.

Figure 7:
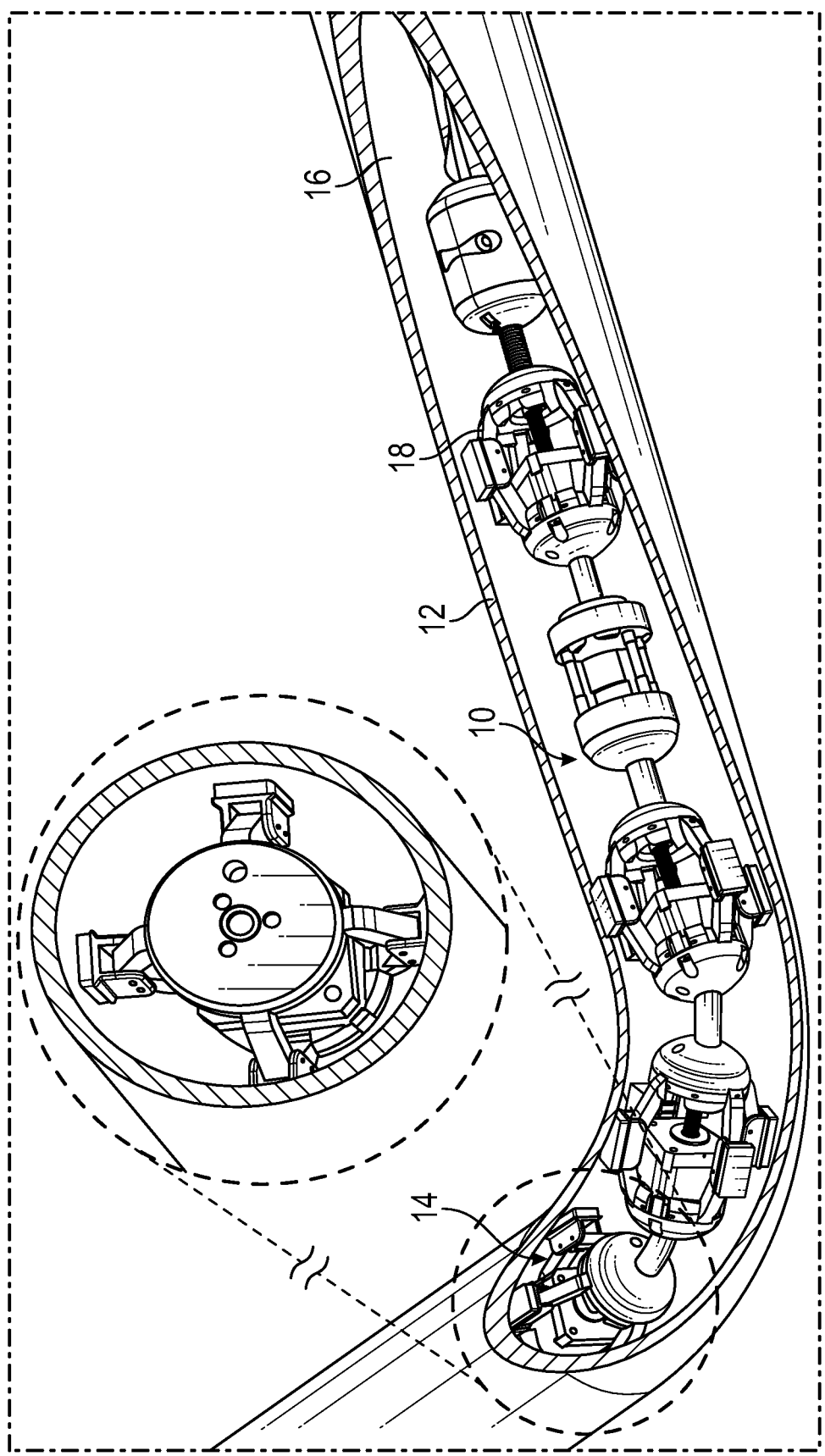
FIG. 7 is a pictorial representation of a gripping test inside a 3-inch pipe in accordance with an aspect of the present disclosure.

With reference to FIG. 7, a pictorial representation of an exemplary gripping test inside a 3-inch pipe 12 in accordance with an aspect of the present disclosure is shown. Low weight and a high gripping force are key aspects of the robotic crawler 10 as they enable carrying inspection and maintenance equipment through the pipe 12. To increase the available pull force, the crawler 10 is configured with four identical modules 14 designed to press against the interior wall 16 of the pipe 12 as shown in FIG. 7. In operation of the robotic crawler 10, all modules 14 are involved in pressing the pipe walls 16, and the extra friction force accommodates for better slip-less operation. In addition, the legs create a separation between the body of the crawler 10 and the internal pipe surface 16 allowing the robot 10 to avoid obstacles such as steps, reducers, and protrusions (see FIG. 9) inside the pipes 12. The use of individual legs 18 allows the module 14 to traverse sharp steps and restrictions as the module 14 can step up onto or over the pipe elements or obstacles.

With reference to FIG. 2, a pictorial representation of the in-pipe inspection crawler 10 using, for example, additive manufacturing in accordance with an aspect of the present disclosure is shown. The crawler 10 is controlled and powered by a tether 200 (FIG. 10) connecting the robot 10 to a self-contained control unit. The tether 200 can be configured to include, in at least one aspect, a bundle of cables, such as the following components:

A power supply cable 208 to the stepper motors 102 of the gripping mechanisms 26 and SMA tension springs 40;

A data signal cable 210 for transmitting the sensor information to control station; and A safety rope 202 or cable for retrieving the robot 10 from the inside the pipe 12 in a situation of emergency power loss or completion of inspection task.

To allow the modules 14 to grip variable diameter piping 12, a sensor-less control strategy method is used. Using the technique, an open loop control of the stepping motor 102 is feasible for stall detection using back-EMF-based load angle estimation. In accordance with at least one aspect, the power signals for the stepper motors 102 are sent directly through the tether 200 (e.g., data signal cable 210) in order to minimize the electronics carried by the prototype. To reduce the number of lines in the tether carrying motor control signals, the crawler may utilize a combination of independent power and control wires. This significantly reduce the weight of the tether and allow for greater and more easily achieved scalability of the crawler as the tether could be more universal between configurations.

A stall in motors 102 typically manifests itself as a detectable current anomaly in the motor controllers. The capability to detect the stall of these motors 102 is built into the motor controllers utilized throughout the prototyping process, which greatly simplified the implementation of this control strategy. Additionally, with this implementation, it is possible to define software thresholds for detecting stalls. In this method, the state of any given module is estimated based on the stall state and elapsed time since the last stall. This results in a series of module contractions and expansions. As a result, over contraction or expansion causing damage to the crawler or pipe wall is extremely unlikely. The system is also what allows each module to independently adapt to the diameter of the pipe surrounding it with no user input or specific mode changes within the software. The software includes a path planning algorithm, a mapping system based on known intersections and pipe geometry changes, and a machine vision system to allow the locomotion method cycle to preemptively adapt for sharp lips, long vertical shafts, and to detect the features identified in the path planning stage.

The electromagnetic torque vector $TmotV_i$ is determined based on the interaction between the stator flux linkage space vector s and the stator current space vector is:

$$TmotV_i = \psi_s \times i_s \qquad (15)$$

Neglecting saturation, the stator flux linkage space vector $\psi_s$ can be written as the sum of the stator flux linkages, established by the two stator currents and the permanent magnet rotor flux $\psi_r$. In the dq-reference frame fixed to the rotor flux, illustrated in FIG. 8, the electromagnetic torque can be written as:

$$T\text{motor}=(\psi r + i_d L_d + i_q L_q) \times i_s \qquad (16)$$

The electromagnetic torque value can be written as a function of is and the load angle δ, defined as the angle between is and the rotor flux $\psi_r$:

$$TmotV=\psi_r i_s \sin(\delta) \qquad (17)$$

The first term (13) describes the torque generated by the interaction between the permanent-magnet rotor flux $\psi_r$ and the stator current is. This term depends on the sine of the load angle. The load angle increases when the load torque increases. A higher rotational speed also results in an increased load angle. The latter is due to a higher friction torque in the test setup. Using Lenz's law (stating the direction of an induced current is always such as to oppose the change in the circuit or the magnetic field producing it), the back-EMF voltage vector es, induced by the rotor flux ψr, can be written as:

$$es=C \cdot \psi_r/dt \qquad (18)$$

This implies a phase lead of π/2 rad between the back-EMF vector es and the flux vector ψr. It follows the angle between the current vector is and the back-EMF vector es is π/2−δ. Because the current can be measured easily, estimating the load angle can be reduced to a problem where the back-EMF signal can be estimated. These principles are applied as a feature of some commercially available stepper motor drivers.

Figure 8:
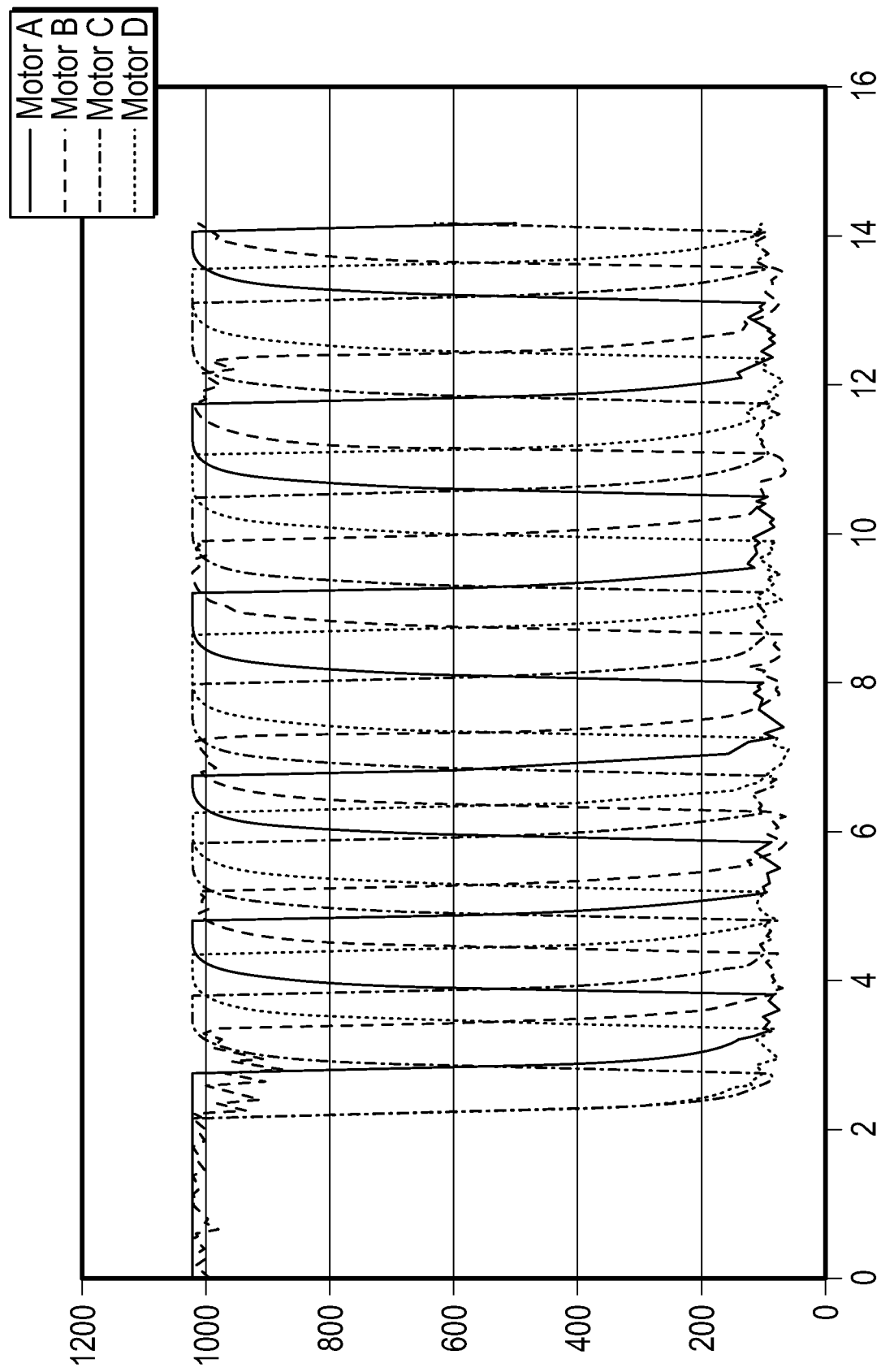
FIG. 8 is a graphical representation of stall detection used for control of a module in gripping and extending actions in accordance with an aspect of the present disclosure.

With reference to FIG. 8, a graphical representation of stall detection used for control of a module in gripping and extending actions in accordance with an aspect of the present disclosure is shown. For the commercially available stepper motor 102 controllers used for the control of the crawler 10, values are transmitted to the microprocessor representing the stall state of each motor 102. A lower value constitutes a greater 5 and, thus, a greater load. In one experiment, a single gripping module 14 was instructed to drive its feet 21 outward until the corresponding stall value dropped below a certain threshold, signifying the feet 21 had hit the walls 16 of the pipe 12 and the stepper motor 102 was stalling. After this, the direction of the motor 102 was reversed to move the feet 21 inwards. Once again, the stall value was monitored to reverse the direction of the movement upon complete extension. This experiment demonstrates the reliable detection of the motor stall occurring when a module's feet 21 contacts the pipe wall and eliminates the additional sensors and wiring required for closed-loop control.

Figure 9:
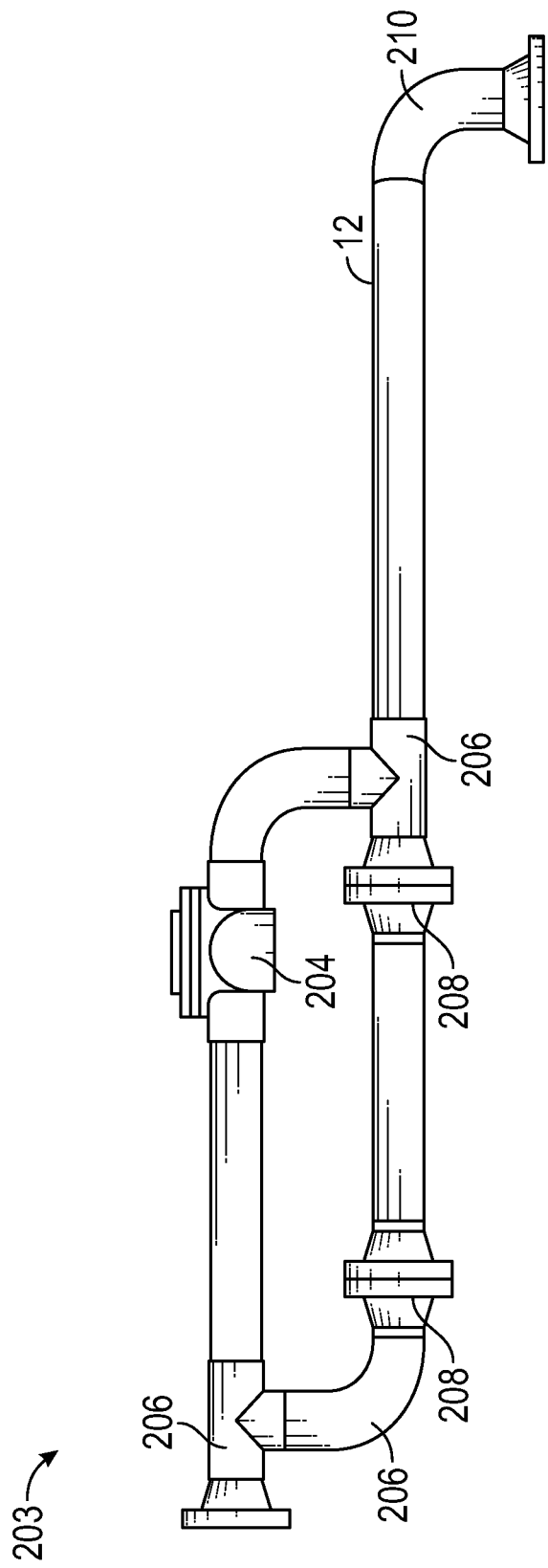
FIG. 9 is a graphical representation of an example of trim & drain piping mockup (3-in CUNI piping, fittings and ball valve) in accordance with an aspect of the present disclosure.

With reference to FIG. 9, a pictorial representation of an example of trim & drain piping mockup (3-in CUNI piping, fittings, and ball valve) in accordance with an aspect of the present disclosure is shown. The crawler 10 is required to travel through the trim and drain pipeline, providing live video feedback, and conducting inspection and maintenance processes. Trim and drain systems are complex networks of piping, valves, pumps, and tanks spanning the entire length of the submarine. The route consists of all 70:30 copper-nickel pipes (MIL-T-16420), which vary between 3, 4 or 5 inches in diameter (7.62 cm, 10.16 cm and 12.70 cm). The series of pipes 12 are configured into a pipeline 203 from valves 204, tee fittings 206, reducers 208, elbows 210, and uneven pipe surfaces up to 0.12 in deep pits. A typical inspection route in the trim and drain system 203 is shown in FIG. 9.

The crawler 10 can include an active multi-sensor non-destructive testing equipment (NDTE) 19. The instrumentation module is designed to provide additional sensor feedback from the crawler 10 during inspections and has proven to enhance the inspection tool capabilities, robustness, and operational feedback. For the robotic crawler 10, the instrumentation module integrates the following sensory data through a novel hybrid sensor fusion approach to utilize the multiple readings from the pipe's interior wall 16 over an improved consensus for general wall thinning and localized damage types and extends. In the instrumentation module, the following additional sensors can be configured and integrated for effective inspection and monitoring, such as:

- Machine vision camera 104 with onboard processing providing autonomous guidance navigation and control;
- Environmental data, including barometric pressure, humidity, and temperature;
- NDTE module 19, providing thermal, radiation, ultrasound, and visual internal pipe mapping;
- Tether pull force sensor, providing estimation of remaining pull force capability;
- Contact pressure sensors to the grippers, providing grip conditions; and
- IMU sensor, providing slope and orientation for each module 14.

The main components of the crawler 10 were constructed using additive manufacturing, and the robot assembly is shown in the figures. A total of four locomotion modules 14 can be fabricated and connected with compliant joints. This renders a flexible yet uniform assembly of modules 14, which maintain module 14 symmetry and keeps its feet 21 parallel to the pipe wall 16. The leading module incorporates a small USB camera 104 to deliver video feed to the operator. The SMA springs 40 are integrated into the leading joint, allowing the steering of the front module 14 and, thus, the crawler 10. The trailing module houses the strain relief mechanism 201 by which the tether 200 is secured.

Figure 10:
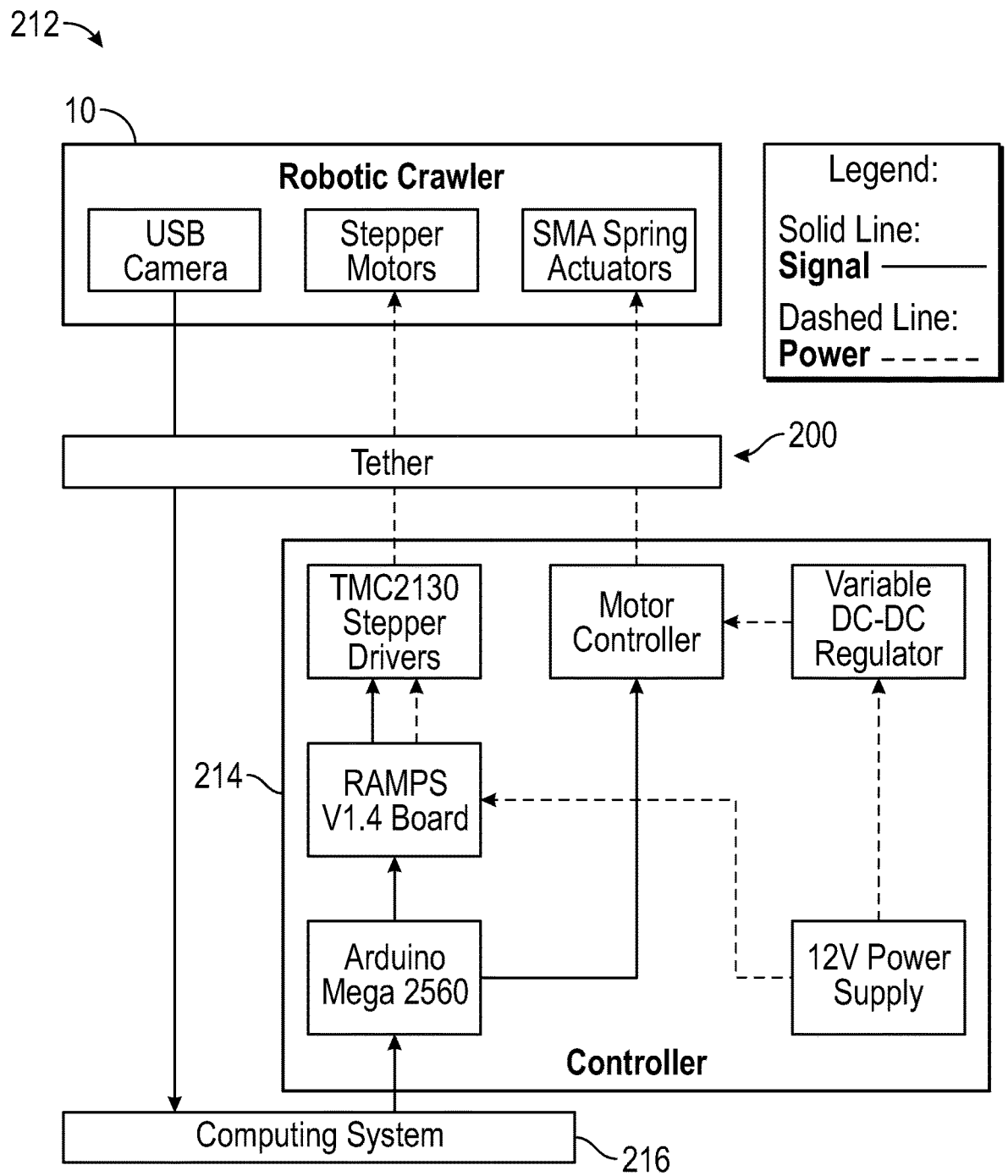
FIG. 10 is a pictorial representation of a controller for the robotic crawler in accordance with an aspect of the present disclosure.

FIG. 10 depicts a control system 212 for the robotic crawler 10 in accordance with an illustrative aspect of the present disclosure. For example, the control system 212 may represent an electronic control device, such as a controller 214 and computer 216, configured to communicate to and receive data from the robotic crawler 10, the control device may also be configured to communicate control signals to and receive feedback from the robotic crawler 10. The computing device 216 may be utilized to receive user settings, instructions, or feedback for controlling the power management features of the robot 10 together and separately. The computing device 216 includes a processor unit (possibly including multiple processors, multiple cores, multiple nodes, and/or implementing multi-threading, etc.). The computing system can include various types of memory. The memory may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system can include a bus (e.g., PCI, ISA, PCI-Express, HyperTransport®, InfiniBand®, NuBus, etc.), a network interface (e.g., an ATM interface, an Ethernet interface, a Frame Relay interface, SONET interface, wireless interface, etc.), and a storage device(s) (e.g., optical storage, magnetic storage, etc.). The system memory embodies functionality to implement aspects described above, for example, via controller 1402. The system memory may include one or more functionalities. Code may be implemented in any of the other devices of the computing system 216, such as the controller 214. Any one of these functionalities may be partially (or entirely) implemented in hardware and/or on the controller 214. For example, the functionality may be implemented with an application specific integrated circuit, in logic implemented in the computing system 216, the controller 214, and/or in a co-processor on a peripheral device or card, etc. Further, realizations may include fewer or additional components not illustrated can include, for example, (e.g., video cards, audio cards, additional network interfaces, peripheral devices, etc.). The computing system 216 and controller 214, the storage device(s), and the network interface can be coupled to a bus. Alternatively, a bus and any memory may be coupled to the computing system 216 and controller 214.

Aspects of the present disclosure may utilize AI (artificial intelligence) to enhance communication and abilities of users to interact through the computing system 216 and controller 214. Artificial intelligence (also machine intelligence, MI) is intelligence demonstrated by machines, in contrast to the natural intelligence (NI) displayed by humans and other animals. In computer science AI is defined as the study of "intelligent agents": any device perceiving its environment and taking actions maximizing its chance of successfully achieving its goals. Colloquially, the term "artificial intelligence" is applied when a machine mimics "cognitive" functions humans associate with other human minds, such as "learning" and "problem solving".

The disclosure is not to be limited to the aspects described herein. In particular, the disclosure contemplates numerous variations and aspects. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes, or methods of the disclosure. It is understood that any other modifications, substitutions, and/or additions can be made, which are within the intended spirit and scope of the disclosure. It is further understood that aspects and description of each figure are not exclusive to the representative illustration but are intended to apply to and provide disclosure for each and all figures and the corresponding illustrations and descriptions for the disclosure as a whole. For example, the written description provided for one figure can include aspects, disclosure, and written description for any one or all of the other figures.

What is claimed is:

1. A system for robotic inspection of a pipeline, comprising:
 a self-propelled robot comprising:
 a plurality of modules, at least one of said modules having a drive mechanism for peristaltic movement of said robot;
 at least one joint member for interconnecting adjacent modules in said robot, said joint member configured to allow articulation of said modules relative to each other through multiple planes and angles, said at least one joint member comprising at least one steerable spring positioned on a first module and connected to a second module;
 at least one expandable foot extending between an actuator and a follower section of the modules.

2. The system of claim 1, further comprising a camera.

3. The system of claim 1, further comprising;
 a stepper motor operably coupled to each of said modules.

4. The system of claim 3, wherein the stepper motor is operably coupled to the follower section and a threaded rod extends from the stepper motor to the actuator.

5. The system of claim 4, wherein rotating of the threaded rod can expand or contract the at least one expandable foot away or toward the modules.

6. The system of claim 5, further comprising:
 a gripping mechanism operably coupled on the expandable foot.

7. The system of claim 6, further comprising:
 a friction pad operably coupled to the gripping mechanism.

8. A modular pipe-crawling robot for in-pipe maintenance operations, comprising:
 at least two locomotion modules;
 each module has feet which can extend outward to grip a wall of a pipe while simultaneously reducing its length or disengaging its feet from the inner wall while increasing its length; and
 a gear mechanism forming a mechanical linkage that extends each module's feet towards the inner wall of the pipe;
 wherein the feet are held perpendicular with respect to the inner wall of the pipe to improve grip.

9. The robot of claim 8, wherein each module foot is configured to grip and extend, allowing the modules to grip the pipe in a peristaltic fashion.

10. The robot of claim 8, wherein forward and/or backward movement can be produced by simultaneously extending and contracting adjacent modules feet.

11. The robot of claim 8, further comprising:
 a joint coupling the at least two modules.

12. The robot of claim 11, wherein the joint is an active joint comprised of four shape-memory alloy springs surrounding a passive joint.

13. A modular pipe-crawling robot for in-pipe maintenance operations, comprising:
 a hybrid gripping module;
 a gripping mechanism comprising at least two legs operably coupled to the gripping module;
 an actuator having rotational motion that provides linear motion for a follower section of the module;
 linkage mechanisms located at geared middle joints having friction pads are operably coupled to the follower; and
 wherein the linkage mechanisms apply force to an internal piping surface to generate traction.

14. The robot of claim 13, wherein the module combines mechanisms for gripping the pipe and forward movement.

15. The robot of claim 14, wherein peristaltic action allows more than one module to grip the pipe at once.

16. The robot of claim 15, wherein forward or backward movement can be produced by simultaneously extending and contracting adjacent modules.

17. The robot of claim 16, further comprising:
 a joint which couples adjacent modules.

18. The robot of claim 17, wherein a first and a second module coupled by an active joint.

19. The robot of claim 18, wherein the active joint is comprised of four shape-memory alloy springs surrounding the passive joint.

* * * * *